Jan. 31, 1956 C. L. HERBERG 2,732,789
DEEP FAT FRYING MACHINE
Filed July 30, 1954 4 Sheets-Sheet 2
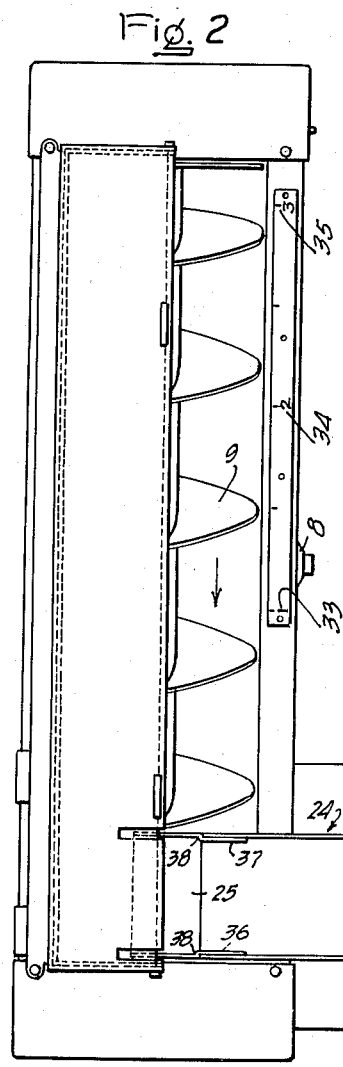
INVENTOR
Clifton L. Herberg
ATTORNEYS Jan. 31, 1956 C. L. HERBERG 2,732,789
DEEP FAT FRYING MACHINE
Filed July 30, 1954 4 Sheets-Sheet 3

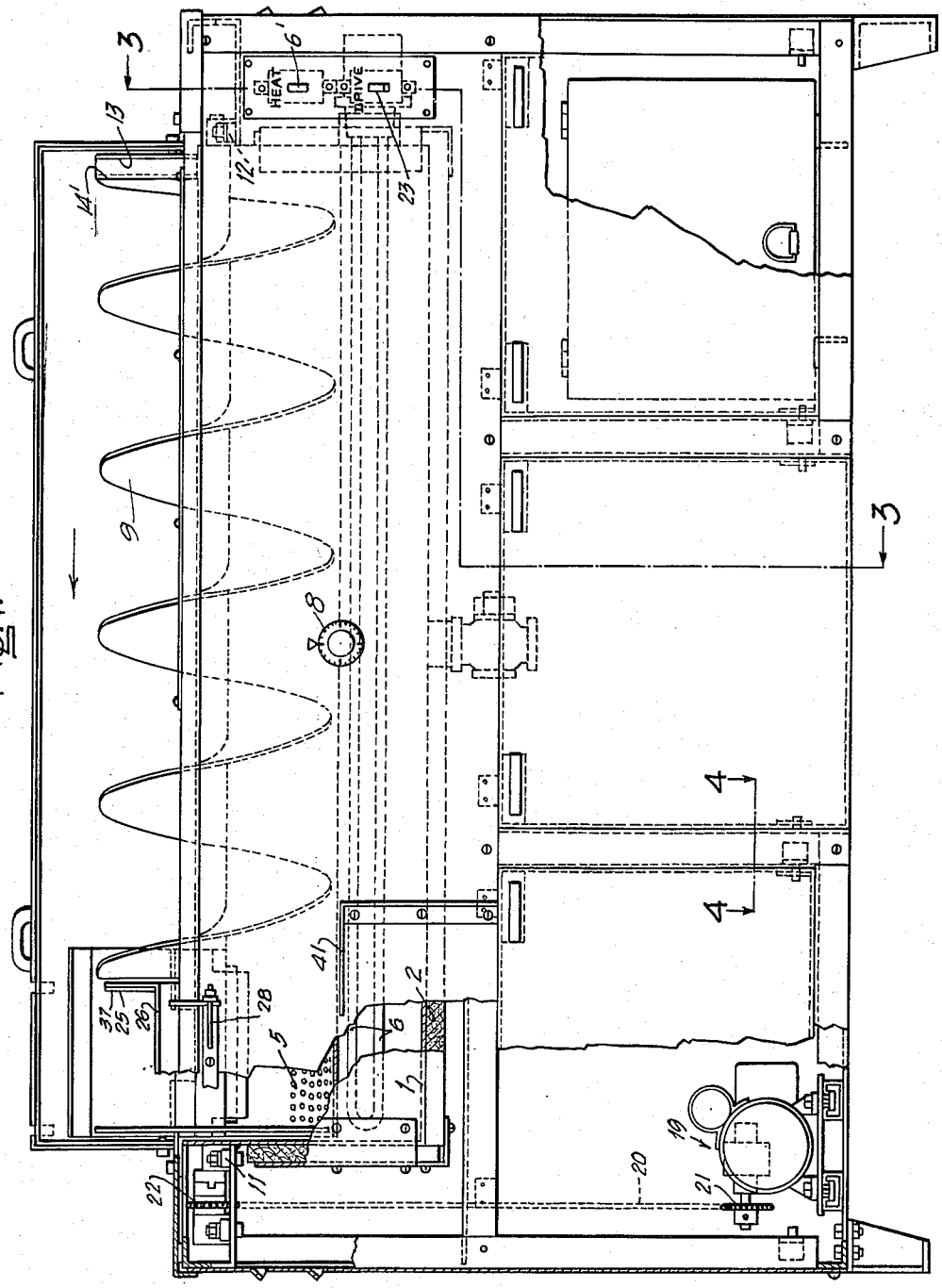

INVENTOR
Clifton L. Herberg
ATTORNEYS

Jan. 31, 1956 C. L. HERBERG 2,732,789
DEEP FAT FRYING MACHINE
Filed July 30, 1954 4 Sheets-Sheet 4
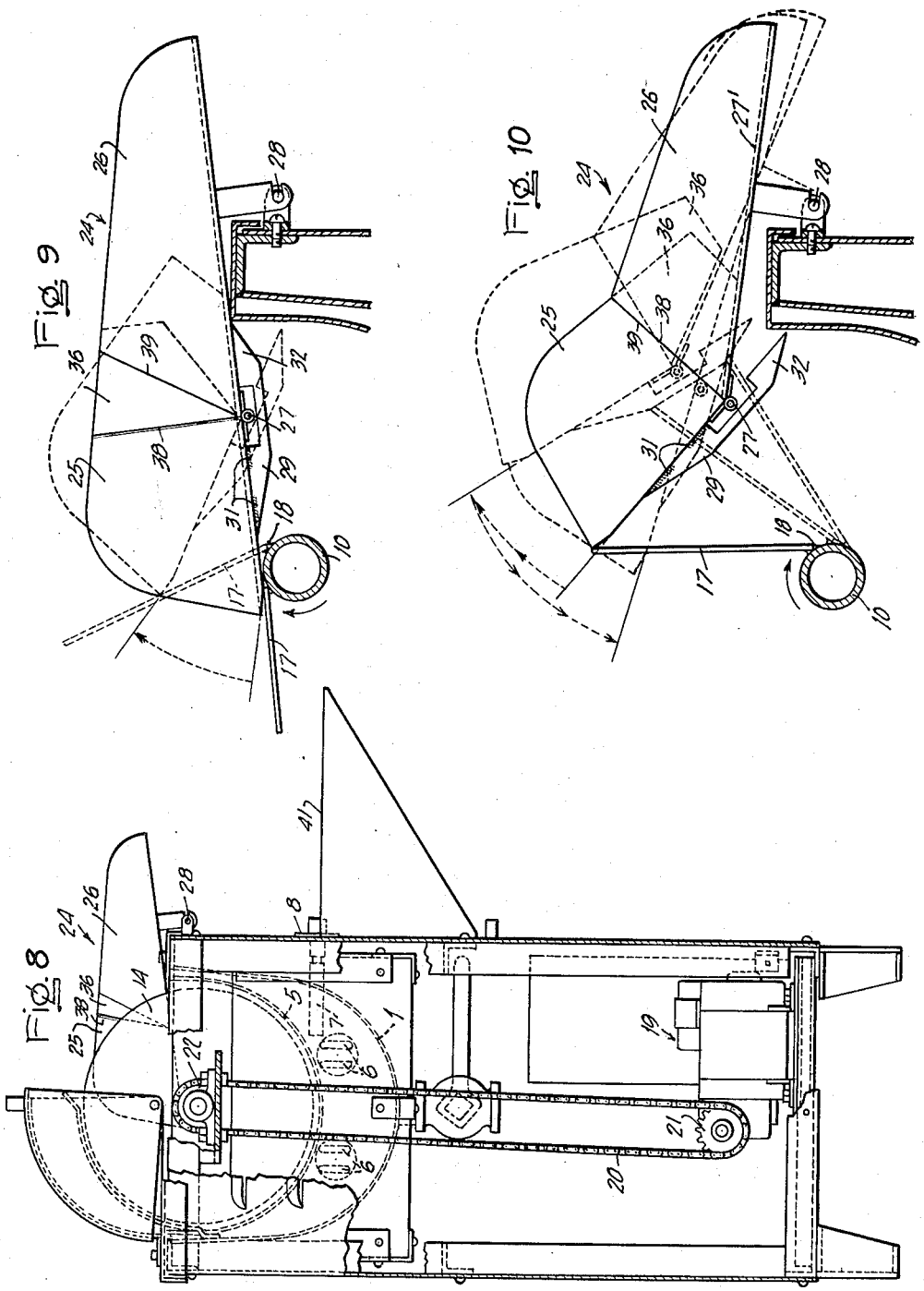
INVENTOR
Clifton L. Herberg
ATTORNEYS United States Patent Office 2,732,789
Patented Jan. 31, 1956

2,732,789
DEEP FAT FRYING MACHINE

Clifton L. Herberg, Hudson, N. Y., assignor to Gifford-Wood Co., Hudson, N. Y., a corporation of New York Application July 30, 1954, Serial No. 446,778

3 Claims. (Cl. 99—404)

My invention relates to deep fat frying machines in which the food to be cooked is moved through an elongated vat containing the cooking oil or fat and from which the cooked food is automatically discharged.

One of the principal objects of my invention is to provide an improved means for automatically discharging the cooked food from the machine. Another object is to provide a cooking device of this character in which different foods requiring different cooking times may be cooked simultaneously.

I accomplish these objects by the means described below and illustrated in the accompanying drawings in which:

Fig. 1 is a front elevation of my machine with portions broken away and portions in section;

Fig. 2 is a top plan view of the machine;

Fig. 3 is a section of Fig. 1 in the plane 3—3;

Fig. 4 is a section of Fig. 1 in the plane 4—4;

Fig. 5 is an enlarged top plan view of that end of the machine from which the cooked food is discharged, with portions broken away;

Fig. 6 is an enlarged, transverse, vertical section through the machine;

Fig. 7 is a fragmentary enlarged section showing a thermostat for controlling the temperature of the cooking fat;

Fig. 8 is an end view of the machine with portions broken away and portions in section;

Fig. 9 is an enlarged side elevation view of the food discharge chute in what may be termed its normal position;

Fig. 10 is a view similar to Fig. 9 showing how the discharge chute is tilted; and Fig. 11 is a perspective view of the helicoidal conveyer with the food lifting plate at the discharge end thereof.

Referring to the drawings, and first to Figs. 1 and 6, my machine comprises an elongated vat 1 which is insulated at the bottom by the board 2 and at the sides by the boards 3 and 4. Suspended in the vat is a semicylindrical screen 5 and between the screen 5 and the bottom of the vat 1 are longitudinally extending electrical heating elements 6 for maintaining the fat in the vat at a desired temperature. The heating elements are turned on and off by the switch 6' and the temperature is controlled automatically by the thermostat 7 which may be set at a desired temperature by means of the dial 8. However, it is to be understood that other means, such for example as a gas burner or electrical resistance heating elements applied to the outer side of the vat, may be employed.

Rotatably mounted within the screen 5 is a helicoidal conveyer 9 of a diameter approximating the internal diameter of said screen. The conveyer has a shaft 10 which is rotatably mounted in bearings 11 and 12 at the opposite ends of the machine. On each end of the shaft is a circular disk 13 and 14 respectively, and the helicoidal portion of the conveyer begins at a point 14' which is abruptly offset from the disk 13 as best shown in Fig. 11. The purpose of this is to prevent the accumulation of food and oil in a narrow space which would be the case if the helicoidal portion of the conveyer continued until it intersected the disk 13. Referring to Fig. 11, the other end of the helicoid terminates at 15 and an arcuate disk 16 extends therefrom parallel to the disk 14. Between the disk 14 and the arcuate disk 16 is a perforated food lifting plate 17 which is welded or otherwise secured to the shaft 10 of the helicoid as best shown at 18 in Figs. 9 and 10.

The conveyer is driven through suitable reduction gears by means of the motor 19, the chain 20 and sprockets 21 and 22, and the motor is controlled by the switch 23 shown in Figs. 1 and 3.

At the end of the vat to which the food is moved by the conveyer 9 is a food discharge chute represented generally by the numeral 24. The chute extends in a direction transversely of the conveyer and is formed of two sections 25 and 26 which are pivotally connected at the bottom by a hinge 27 having its axis parallel to the axis of the conveyer. The section 26 has its bottom 27' pivotally mounted on the side of the machine at 28, as best shown in Figs. 9 and 10. At the bottom of section 25 are two elements 29 and 30 (see Figs. 5, 9 and 10) which are welded thereto as shown at 31 in Figs. 9 and 10. When the chute is at rest, the ends 32 of the members 29 and 30 rest against the bottom of the section 26 and maintain the bottoms of said sections substantially coplanar, and also prevent the rotation of the section 25 in a counterclockwise direction beyond the point where the bottoms are coplanar.

In operation, food to be cooked may be deposited in the vat at substantially any point, and when the conveyer is running at a predetermined speed, I have provided insignia (see Fig. 2) such as shown at 33, 34 and 35 indicating the intervals of time which will elapse between the placing of the food in the vat opposite the insignia and the time it is removed from the fat as described below.

Referring now more particularly to Figs. 9 and 10, as the shaft 10 of the conveyer rotates, the food lifter 17 sweeps the cooked food at the end of the vat ahead of it thus picking it up to deposit it in the section 25 of the chute. The cooked food which is on the lifter plate 17 when the parts are in the position shown in Fig. 9 is carried upwardly as is also the section 25 of the chute which swings about the hinge; the portion 26 in the meantime remains stationary. The bottom of the section 25 extends only to a point above the hinge 27, and it will be noted that the bottoms of sections 25 and 26 are normally coplanar and downwardly inclined towards the vat so that any oil or fat remaining therein from food discharged therethrough will drain back into the vat. Those portions 36 and 37 of the sides of the section 25 are struck in at 38 so that they lie against the inner sides of the section 26. The section 25 continues to tip about the hinge 27 as shown in Figs. 9 and 10 until the bottoms of the portions 36 and 37 strike the bottom of the section 26 and the line of the struck in portions contacts the inner end 39 of section 26, and at least a portion of the cooked food in section 25 slides into section 26. At this point, the bottom of each section is inclined towards the hinge between them so that any oil or fat which is deposited in section 25 with the food dumped therein can flow downwardly and leak back into the vat through the zone around the hinge. Thereafter, both sections tilt as a unit about the axis of the pivotal connection 28 to a position in which the slope of the bottoms of the sections exceeds the angle of repose of all the food in the chute which then slides out the open end.

In order to support a receptacle 40 for receiving the food, a shelf 41 is secured to the side of the machine as shown in Figs. 5, 6 and 8.

From the foregoing it will be apparent that foods requiring say a three minute cooking period may be deposited in the vat opposite the point marked 3 in Fig. 2, and other foods requiring shorter periods of cooking may be deposited at the same time in the vat opposite the points 1 and 2. It is to be understood that the conveyer is long enough and its speed of rotation such that food placed in the vat opposite any of the insignia will remain in the vat long enough to be cooked.

While I have described my invention in its preferred embodiment the words which I have used are words of description, rather than of limitation, and that changes within the purview of the appended claims may be made without departing from the true scope and spirit thereof.

What I claim is:

1. A deep fat frying machine comprising an elongated vat adapted to hold said fat; a semi-cylindrical screen suspended in said vat; a helicoidal food conveyer of diameter approximately the same as the inner surface of said screen and having a shaft rotatably mounted substantially coaxial with said screen; means for heating the fat in said vat and maintaining it at a desired temperature; a motor for rotating said conveyer at a desired rate; a perforated plate forming a cooked food lifter secured to said shaft adjacent the end thereof toward which said food is conveyed; a cooked food discharge chute comprising two sections extending transversely of said vat and normally inclined to drain into said vat; a hinge connecting said sections together in a zone over said vat; the first of said sections extending over said vat above said lifter in a position to be progressively tilted about the axis of said hinge by said lifter as it moves in contact therewith, and the second of said sections extending over and beyond the outer side of said vat and provided with a pivotal mounting at the side of said machine; and means on one of said sections adapted to cooperate with the other section, after said first section has been tilted until it is downwardly inclined towards said hinge for stopping the tilting movement of said first section about the axis of said hinge and, thereafter, causing both of said sections to be tilted by the further movement of said lifter about the axis of said pivotal mounting.

2. In a deep fat frying machine, the combination with an elongated vat having a helicoidal conveyer therein for moving food to be cooked from a zone adjacent one end of said vat to a zone adjacent the other end thereof; of a discharge chute at said other end of said vat for automatically removing the cooked food and normally downwardly inclined to drain into said vat; a pivotal mounting for said chute about which it is tiltable to discharge its contents over the side of said vat; said chute comprising a first section extending from a point above the axis of said conveyer to a point intermediate said axis and the side of said vat, a second section partially surrounding said first section, and a hinge connecting said sections together in a zone over said vat; means on said conveyer cooperating with said first section for initially tilting said first section about the axis of said hinge to discharge at least a portion of its contents into said second section, and thereafter tilting both sections together as a unit about the axis of said pivotal mounting to effect a discharge of the contents of both of said sections.

3. In a deep fat frying machine comprising an elongated vat, a helicoidal conveyer, including a shaft, extending longitudinally of and rotatably mounted in said vat for conveying food being cooked therein to one end of said vat; means for automatically removing cooked food from said vat comprising a food lifting plate secured to said shaft adjacent the end thereof to which food is carried by said conveyer, and extending laterally from the axis of said conveyer shaft a distance substantially equal to the radius of said conveyer; a food discharge chute normally downwardly inclined to drain into said vat and comprising a first section having the bottom thereof disposed to be contacted and lifted by said plate as it turns with said shaft; a second section extending beyond the side of said machine and having a pivotal mounting on said machine beneath it and about the axis of which it is tiltable; a hinge pivotally connecting said sections together at the bottoms thereof in a zone over said vat and having its axis parallel to the axis of said pivotal mounting; means on the bottom of said first section normally maintaining the bottoms of said sections substantially coplanar when said chute is at rest and adapted to cooperate with said plate to effect a tilting of said first section about the axis of said hinge and the discharge of at least a portion of the contents of said first section into said second section; and means on one of said sections adapted to cooperate with the other section to effect a tilting of both sections, as a unit, about said pivotal mounting and a discharge of the contents thereof following a discharge of a portion of the contents of said first section into said second section.

References Cited in the file of this patent
UNITED STATES PATENTS

| | | |
|---|---|---|
| 2,470,446 | Rankin | May 17, 1949 |
| 2,643,603 | Balluteen | June 30, 1953 |